US006633969B1

(12) United States Patent
Lin

(10) Patent No.: US 6,633,969 B1
(45) Date of Patent: Oct. 14, 2003

(54) INSTRUCTION TRANSLATION SYSTEM AND METHOD ACHIEVING SINGLE-CYCLE TRANSLATION OF VARIABLE-LENGTH MIPS16 INSTRUCTIONS

(75) Inventor: Shuaibin Lin, Broomfield, CO (US)

(73) Assignee: LSI Logic Corporation, Milpitas, CA (US)

( * ) Notice: Subject to any disclaimer, the term of this patent is extended or adjusted under 35 U.S.C. 154(b) by 603 days.

(21) Appl. No.: 09/637,230

(22) Filed: Aug. 11, 2000

(51) Int. Cl.[7] .................................................. G06F 9/30
(52) U.S. Cl. ........................................ 712/210; 712/213
(58) Field of Search ................................. 712/210, 208, 712/204, 213, 22, 23, 24, 200, 211; 710/68; 345/501, 419, 522

(56) References Cited

U.S. PATENT DOCUMENTS

| 3,614,741 | A | 10/1971 | McFarland, Jr. et al. |
| 3,771,138 | A | 11/1973 | Celtruda et al. |
| 3,787,673 | A | 1/1974 | Watson et al. |
| 3,875,391 | A | 4/1975 | Shapiro et al. |
| 4,075,704 | A | 2/1978 | O'Leary |
| 4,112,489 | A | 9/1978 | Wood |
| 4,222,103 | A | 9/1980 | Chamberlin |
| 4,240,139 | A | 12/1980 | Fukuda et al. |
| 4,274,138 | A | 6/1981 | Shimokawa |
| 4,366,536 | A | 12/1982 | Kohn |
| 4,388,682 | A | 6/1983 | Eldridge |
| 4,399,507 | A | 8/1983 | Cosgrove et al. |
| 4,434,465 | A | 2/1984 | McDonough et al. |
| 4,437,149 | A | 3/1984 | Pomerene et al. |
| 4,488,227 | A | 12/1984 | Miu et al. |

(List continued on next page.)

FOREIGN PATENT DOCUMENTS

| EP | 0 109 567 | 10/1986 |
| EP | 0 169 565 | 4/1992 |
| EP | 0 199 173 | 2/1994 |
| EP | 0 306 920 | 1/1996 |
| EP | 0 324 308 | 3/1996 |
| GB | 2 016 755 | 9/1979 |
| GB | 2 290 395 | 12/1995 |
| JP | 58003040 | 1/1983 |
| WO | 95/30187 | 11/1995 |
| WO | 95/30188 | 11/1995 |

OTHER PUBLICATIONS

Goudge et al., "Thumb: Reducing the Cost of 32–bit RISC Performance in Portable and Consumer Applications," © 1996 IEEE, pp. 176–181.
Segars et al., "Embedded Control Problems, Thumb, and the ARM7TDMI," IEEE Micro, Oct. 1995, pp. 22–30.

*Primary Examiner*—Henry W. H. Tsai
(74) *Attorney, Agent, or Firm*—Conley, Rose & Tayon

(57) ABSTRACT

An apparatus and method for translating variable-length instructions to fixed-length instructions. The apparatus includes instruction decompression logic and caching logic. The instruction decompression logic receives a first portion of an instruction data block, an output signal produced by the caching logic, and a control signal during a time period. The instruction decompression logic produces a fixed-length instruction during the time period dependent upon the first portion of the instruction data block, the output signal produced by the caching logic, and the control signal. The caching logic includes a storage unit. During the time period, the caching logic receives a second portion of the instruction data block and the control signal. The caching logic stores the second portion of the instruction data block within the storage unit during the time period dependent upon the control signal.

34 Claims, 7 Drawing Sheets

U.S. PATENT DOCUMENTS

| | | |
|---|---|---|
| 4,491,912 A | 1/1985 | Kainaga et al. |
| 4,498,136 A | 2/1985 | Sproul, III |
| 4,819,165 A | 4/1989 | Lenoski |
| 4,829,424 A | 5/1989 | Lee |
| 4,833,640 A | 5/1989 | Baba |
| 4,839,797 A | 6/1989 | Katori et al. |
| 4,897,787 A | 1/1990 | Kawasaki et al. |
| 4,990,910 A | 2/1991 | Takishima et al. |
| 4,991,080 A | 2/1991 | Emma et al. |
| 5,025,366 A | 6/1991 | Baror |
| 5,050,068 A | 9/1991 | Dollas et al. |
| 5,081,574 A | 1/1992 | Larsen et al. |
| 5,101,483 A | 3/1992 | Tanagawa |
| 5,109,495 A | 4/1992 | Fite et al. |
| 5,117,488 A | 5/1992 | Noguchi et al. |
| 5,163,139 A | 11/1992 | Haigh et al. |
| 5,179,680 A | 1/1993 | Colwell et al. |
| 5,184,229 A | 2/1993 | Saito et al. |
| 5,226,129 A | 7/1993 | Ooi et al. |
| 5,237,700 A | 8/1993 | Johnson et al. |
| 5,238,874 A | 8/1993 | Yamada |
| 5,249,273 A | 9/1993 | Yoshitake et al. |
| 5,280,593 A | 1/1994 | Bullions, III et al. |
| 5,359,715 A | 10/1994 | Heil et al. |
| 5,371,711 A | 12/1994 | Nakayama |
| 5,371,864 A | 12/1994 | Chuang |
| 5,377,336 A | 12/1994 | Eickemeyer et al. |
| 5,396,634 A | 3/1995 | Zaidi et al. |
| 5,398,327 A | 3/1995 | Yoshida |
| 5,400,075 A | 3/1995 | Savatier |
| 5,404,472 A | 4/1995 | Kurosawa et al. |
| 5,404,482 A | 4/1995 | Stamm et al. |
| 5,408,622 A | 4/1995 | Fitch |
| 5,438,668 A | 8/1995 | Coon et al. |
| 5,440,404 A | 8/1995 | Okamoto |
| 5,440,701 A | 8/1995 | Matsuzaki et al. |
| 5,442,760 A | 8/1995 | Rustad et al. |
| 5,442,761 A | 8/1995 | Toda et al. |
| 5,442,762 A | 8/1995 | Kato et al. |
| 5,446,862 A | 8/1995 | Ohkami |
| 5,459,847 A | 10/1995 | Okamura |
| 5,463,699 A | 10/1995 | Wilkinson |
| 5,463,700 A | 10/1995 | Nakazawa |
| 5,463,746 A | 10/1995 | Brodnax et al. |
| 5,465,377 A | 11/1995 | Blaner et al. |
| 5,467,134 A | 11/1995 | Laney et al. |
| 5,475,853 A | 12/1995 | Blaner et al. |
| 5,479,527 A | 12/1995 | Chen |
| 5,479,621 A | 12/1995 | Duranton |
| 5,481,364 A | 1/1996 | Ito |
| 5,481,684 A | 1/1996 | Richter et al. |
| 5,481,693 A | 1/1996 | Blomgren et al. |
| 5,493,687 A | 2/1996 | Garg et al. |
| 5,500,942 A | 3/1996 | Eickemeyer et al. |
| 5,502,826 A | 3/1996 | Vassiliadis et al. |
| 5,510,785 A | 4/1996 | Segawa et al. |
| 5,524,211 A | 6/1996 | Woods et al. |
| 5,526,499 A | 6/1996 | Bernstein et al. |
| 5,526,510 A | 6/1996 | Akkary et al. |
| 5,537,559 A | 7/1996 | Kane et al. |
| 5,539,401 A | 7/1996 | Kumaki et al. |
| 5,540,788 A | 7/1996 | Defalco et al. |
| 5,542,059 A | 7/1996 | Blomgren |
| 5,542,060 A | 7/1996 | Yoshida |
| 5,546,552 A | 8/1996 | Coon et al. |
| 5,550,542 A | 8/1996 | Inoue |
| 5,568,646 A | 10/1996 | Jaggar |
| 5,574,887 A | 11/1996 | Fitch |
| 5,574,927 A | 11/1996 | Scantlin |
| 5,574,928 A | 11/1996 | White et al. |
| 5,574,939 A | 11/1996 | Keckler et al. |
| 5,577,200 A | 11/1996 | Abramson et al. |
| 5,577,259 A | 11/1996 | Alferness et al. |
| 5,581,718 A | 12/1996 | Grochowski |
| 5,598,544 A | 1/1997 | Ohshima |
| 5,619,666 A | 4/1997 | Coon et al. |
| 5,619,667 A | 4/1997 | Henry et al. |
| 5,627,992 A | 5/1997 | Baror |
| 5,632,024 A | 5/1997 | Yajima et al. |
| 5,652,852 A | 7/1997 | Yokota |
| 5,737,625 A | 4/1998 | Jaggar |
| 5,781,750 A | 7/1998 | Blomgren et al. |
| 5,809,309 A | 9/1998 | Leach et al. |
| 5,812,868 A | 9/1998 | Moyer et al. |
| 5,819,058 A * | 10/1998 | Miller et al. ................ 712/210 |
| 5,826,054 A * | 10/1998 | Jacobs et al. ............... 712/213 |
| 5,832,293 A | 11/1998 | Popescu et al. |
| 5,835,748 A | 11/1998 | Orenstein et al. |
| 5,852,741 A * | 12/1998 | Jacobs et al. ................. 712/24 |
| 5,867,682 A | 2/1999 | Witt et al. |
| 5,867,724 A | 2/1999 | McMahon |
| 5,881,260 A * | 3/1999 | Raje et al. .................. 712/210 |
| 5,881,280 A | 3/1999 | Gupta et al. |
| 5,896,519 A * | 4/1999 | Worrell ...................... 712/213 |
| 5,907,714 A | 5/1999 | Boutaud et al. |
| 5,974,508 A | 10/1999 | Maheshwari |
| 6,028,610 A * | 2/2000 | Deering ...................... 345/501 |
| 6,131,152 A * | 10/2000 | Ang et al. .................... 712/24 |
| 6,199,126 B1 * | 3/2001 | Auerbach et al. ............ 710/68 |
| 6,438,676 B1 * | 8/2002 | Sijstermans ................. 712/22 |

* cited by examiner

INSTRUCTION TRANSLATION SYSTEM AND METHOD ACHIEVING SINGLE-CYCLE TRANSLATION OF VARIABLE-LENGTH MIPS16 INSTRUCTIONS

BACKGROUND OF THE INVENTION

1. Field of the Invention

This invention relates to the field of computer processors, and more particularly to computer processors executing variable-length instructions.

2. Description of the Related Art

Computer processor architectures may generally be classified as either complex instruction set computing (CISC) architectures or reduced instruction set computing (RISC) architectures. CISC architectures (e.g., the x86 processor architecture) specify an instruction set including high level, relatively complex instructions. Often, processors implementing CISC architectures decompose the complex instructions into multiple simpler operations which may be more readily implemented in hardware. Microcoded routines stored in an on-chip read-only memory (ROM) have been successfully employed for providing the decomposed operations corresponding to an instruction. More recently, hardware decoders which separate the complex instructions into simpler operations have been adopted by certain CISC processor designers.

Conversely, RISC architectures specify an instruction set including low level, relatively simple instructions. Typically, each instruction within the instruction set is directly implemented in hardware. Complexities associated with the CISC approach are removed, resulting in simpler hardware implementations. Such simpler hardware implementations are often capable of higher frequency operation. The MIPS architecture is an exemplary RISC architecture.

Although not necessarily a defining feature, variable-length instruction sets have often been associated with CISC architectures, while fixed-length instruction sets have been associated with RISC architectures. Variable-length instruction sets use dissimilar numbers of bits to encode the various instructions within the set as well as to specify addressing modes for the instructions, etc. Generally speaking, variable-length instruction sets attempt to pack instruction information as efficiently as possible into the byte or bytes representing each instruction. Conversely, fixed-length instruction sets employ the same number of bits for each instruction (the number of bits is typically a multiple of eight such that each instruction fully occupies a fixed number of bytes). Typically, a small number of instruction formats including fixed fields of information are defined. Decoding each instruction is thereby simplified to routing bits corresponding to each fixed field to logic designed to decode that field.

Because each instruction in a fixed-length instruction set includes a fixed number of bytes, locating instructions is simplified as well. The location of numerous instructions subsequent to a particular instruction is implied by the location of the particular instruction (i.e. as fixed offsets from the location of the particular instruction). Conversely, locating a second variable-length instruction requires locating the end of the first variable-length instruction; locating a third variable-length instruction requires locating the end of the second variable-length instruction, etc. Still further, variable-length instructions lack the fixed field structure of fixed-length instructions. Decoding is further complicated by the lack of fixed fields.

RISC architectures employing fixed-length instruction sets suffer from problems not generally applicable to CISC architectures employing variable-length instruction sets. Because each instruction is fixed length, certain of the simplest instructions may effectively waste memory by occupying bytes which do not convey information concerning the instruction. In contrast, variable-length instruction sets pack the instruction information into a minimal number of bytes.

Still further, since RISC architectures do not include the more complex instructions employed by CISC architectures, the number of instructions in a program coded with RISC instructions may be larger than the number of instructions employed in the same program coded in with CISC instructions. Each of the more complex instructions coded in the CISC version of the program is replaced by multiple instructions in the RISC version of the program. Therefore, the RISC version of a program often occupies significantly more memory than the CISC version of the program. Correspondingly, a greater instruction bandwidth is required between memory storing the program and the processor is needed for the RISC version of the program than for the CISC version of the program.

In the past, the MIPS RISC architecture supported only a 32-bit MIPS instruction set including fixed-length, 32-bit MIPS instructions. More recently, the MIPS architecture has been expanded to include an optional "MIPS16 application-specific extension (ASE)." The MIPS16 ASE defines both 16-bit MIPS16 instructions and 32-bit MIPS16 instructions. The MIPS16 instruction set is thus by definition a variable-length instruction set. Each "compressed" MIPS16 instruction has a corresponding "non-compressed" 32-bit MIPS instruction, and translation hardware is commonly used to translate MIPS16 instructions to corresponding 32-bit MIPS instructions for execution by a MIPS processor. The MIPS16 instruction set allows instructions to be encoded using fewer bits, and the MIPS16 version of a program often occupies significantly less memory than the 32-bit MIPS version of the same program.

SUMMARY OF THE INVENTION

An apparatus and method for translating variable-length instructions to fixed-length instructions are described. The apparatus (e.g., an instruction decompressor) includes instruction decompression logic and caching logic. The instruction decompression logic receives a first portion of an instruction data block, an output signal produced by the caching logic, and a control signal during a time period (e.g., a cycle of a clock signal). The instruction data block may include, for example, a fixed number of bits of software code (i.e., instruction data). The instruction data block includes a first variable-length instruction. The instruction decompression logic produces a fixed-length instruction during the time period dependent upon the first portion of the instruction data block, the output signal produced by the caching logic, and the control signal.

The caching logic includes a storage unit. During the same time period that the instruction decompression logic produces the fixed-length instruction, the caching logic receives a second portion of the instruction data block and the control signal. The caching logic stores the second portion of the instruction data block within the storage unit during the time period dependent upon the control signal. During the time period, the output signal produced by the caching logic is either the second portion of the instruction data block or the contents of the storage unit.

In one embodiment, the apparatus is an instruction decompressor receiving 32-bit blocks of instruction data (e.g., from an instruction cache). Each 32-bit instruction data block includes at least one, and at most two, variable-length MIPS16 instructions. During a cycle of a provided clock signal, the instruction decompressor may translate (i.e., decompress) a complete first MIPS16 instruction within a first 16-bit portion of the 32-bit instruction data block to form a fixed-length, 32-bit MIPS instruction. When the second 16-bit portion of the 32-bit instruction data block includes only a portion of a second MIPS16 instruction, the caching logic is used to save information conveyed by the portion of the second MIPS16 instruction for use during the next cycle of the clock signal. By virtue of the caching logic, the instruction decompressor is able to produce a 32-bit MIPS instruction during each cycle of the clock signal.

The storage unit of the apparatus may, for example, store the second portion of the instruction data block during the time period when the control signal indicates the instruction data block includes only a portion of a second variable-length instruction. The apparatus may include check logic receiving the instruction data block and producing the control signal dependent upon whether or not the instruction data block includes only a portion of a second variable-length instruction. The apparatus may also include routing logic receiving the instruction data block and producing the first and second portions of the instruction data block.

One embodiment of a method for translating variable-length instructions to fixed-length instructions includes receiving the above described instruction data block. The following steps are performed simultaneously: (i) translating the first variable-length instruction to produce a fixed-length instruction; and (ii) if the instruction data block includes only a portion of a second variable-length instruction, saving at least a part of the portion of the second variable-length instruction for use in subsequent translating of the second variable-length instruction. The portion of the second variable-length instruction may, for example, include information identifying the instruction type (e.g., opcode information) and instruction data. In this situation, the saving may include: (i) saving a value of a control signal indicating the instruction type; and (ii) saving at least a part of the instruction data.

A central processing unit is described including the instruction decompressor, and a computer system is described including the central processing unit.

Figure 1:
FIG. 1 is a generic format of a fixed-length, 32-bit MIPS instruction.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 is a generic format of a fixed-length, 32-bit MIPS instruction 10. The 6 most significant (i.e., highest ordered) bits 26–31 of instruction 10 specify an operation code (i.e., opcode).

Figure 2:
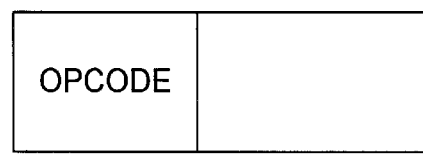
FIG. 2 is a generic format of a 16-bit MIPS16 instruction.
Figure 2B:
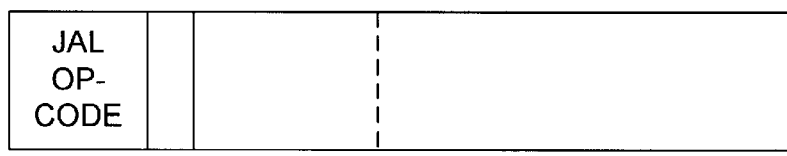
FIG. 2B is a generic format of a 32-bit MIPS16 Jump-And-Link/Jump-And-Link-Exchange (JAL/JALX) instruction.
Figure 2C:
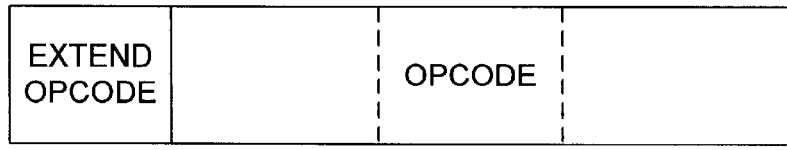
FIG. 2C is a generic format of a 32-bit MIPS16 EXTEND instruction.

FIGS. 2A–2C are generic formats of MIPS16 instructions. FIG. 2A is a generic format of a 16-bit MIPS16 instruction 12. The 5 most significant (i.e., highest ordered) bits 11–15 of the 16-bit MIPS16 instruction 12 specify an opcode. FIG. 2B is a generic format of a 32-bit MIPS16 Jump-And-Link/Jump-And-Link-Exchange (JAL/JALX) instruction 14. The 5 most significant (i.e., highest ordered) bits 27–31 of JAL/JALX instruction 14 specify a JAL opcode. The value of a bit 26 of JAL/JALX instruction 14 determines whether instruction 14 is a Jump-And-Link (JAL) instruction or a Jump-And-Link-Exchange (JALX) instruction. If bit 26 is a '0', instruction 14 is a JAL instruction. If bit 26 is a '1', instruction 14 is a JALX instruction. The remaining 26 bits 0–25 of JAL/JALX instruction 14 specify a part of a target address.

FIG. 2C is a generic format of a 32-bit MIPS16 EXTEND instruction 16. EXTEND instruction 16 includes a 16-bit extend portion 18 immediately preceding an extendable 16-bit MIPS16 instruction 19. The 5 most significant (i.e., highest ordered) bits of extendable 16-bit MIPS16 instruction 19, bits 11–15 of EXTEND instruction 16, specify an opcode of extendable 16-bit MIPS16 instruction 19. The 5 most significant (i.e., highest ordered) bits of extend portion 18, bits 27–31 of EXTEND instruction 16, specify an EXTEND opcode. The remaining 11 bits of extend portion 18, bits 16–26 of EXTEND instruction 16, include data used to extend the fields of extendable 16-bit MIPS16 instruction 19.

Figure 3:
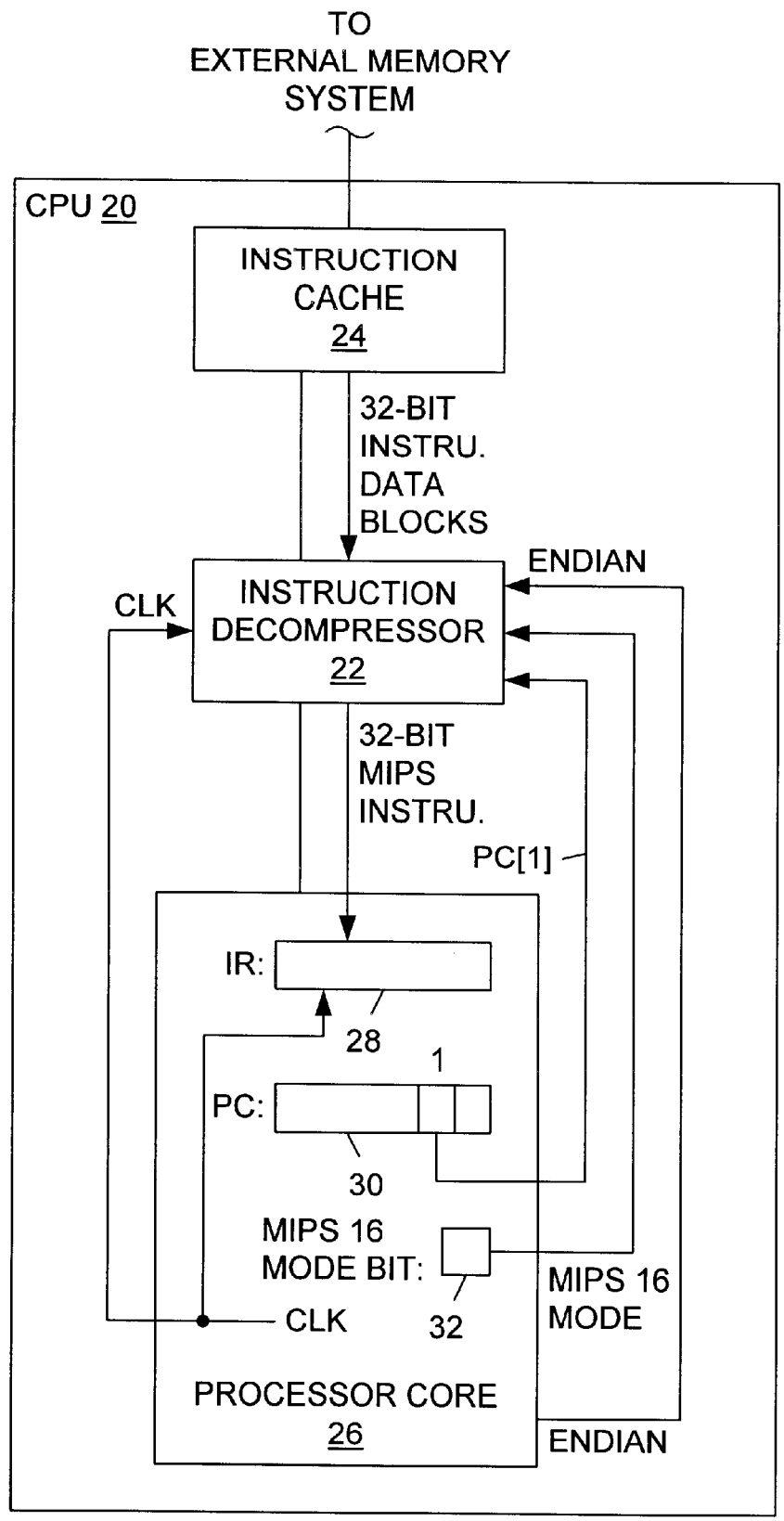
FIG. 3 is a block diagram of one embodiment of a central processing unit (CPU), wherein the CPU executes 32-bit MIPS instructions and/or MIPS16 instructions, and wherein the CPU includes an instruction decompressor for translating (i.e., decompressing) compressed MIPS16 instructions to form non-compressed 32-bit MIPS instructions.

FIG. 3 is a block diagram of one embodiment of a central processing unit (CPU) 20. CPU 20 executes instructions (i.e., code) stored within an external memory system. The code may include 32-bit MIPS instructions, MIPS16 instructions, or both 32-bit MIPS instructions and MIPS16 instructions. When the code includes both 32-bit MIPS instructions and MIPS16 instructions, the 32-bit MIPS instructions and MIPS16 instructions reside in different portions or segments of the code. That is, the code has one or more portions including only 32-bit MIPS instructions (i.e., one or more 32-bit MIPS code segments), and one or more portions including only MIPS16 instructions (i.e., one or more MIPS16 code segments.

In the embodiment of FIG. 3, CPU 20 includes an instruction decompressor 22 coupled between an instruction cache 24 and a processor core 26. Instruction cache 24 is coupled to receive code from an external memory system. As described above, the code includes 32-bit MIPS instructions and/or MIPS16 instructions. Instruction cache 24 is configured to store the code, and to provide the code to instruction decompressor 22 in 32-bit blocks of instruction data. Instruction decompressor 22 receives the 32-bit instruction data blocks from instruction cache 24, produces 32-bit MIPS instructions from the 32-bit blocks, and provides the 32-bit MIPS instructions to processor core 26.

As will be described in more detail below, each 32-bit instruction data block instruction decompressor 22 receives from instruction cache 24 includes either a single 32-bit MIPS instruction or MIPS16 code. If instruction decompressor 22 receives a 32-bit instruction data block including MIPS16 code, instruction decompressor 22 decompresses the MIPS16 code, thereby producing the corresponding 32-bit MIPS instructions. On the other hand, if instruction decompressor 22 receives a 32-bit block including a single 32-bit MIPS instruction, instruction decompressor 22 simply produces the 32-bit MIPS instruction unchanged as decompression is not necessary.

Processor core 26 executes 32-bit MIPS instructions of the 32-bit MIPS instruction set. Processor core 26 includes a 32-bit instruction register (IR) 28 for storing a 32-bit MIPS instruction currently being executed by processor core 26. Instruction register 28 receives a 32-bit MIPS instruction produced by instruction decompressor 22 and a clock signal 'CLK' produced within processor core 26, and stores the 32-bit MIPS instruction in response to the CLK signal. Processor core 26 provides the CLK signal to instruction decompressor 22 for synchronization.

Processor core 26 also includes a MIPS16 mode bit 32 used to indicate a compression mode of CPU 20. As indicated in FIG. 3, the contents of MIPS16 mode bit 32 is provided to instruction decompressor 22 as a 'MIPS16 MODE' signal in order to signal the need for code decompression to instruction decompressor 22. For example, a '0' may be stored in MIPS16 mode bit 32 when processor core 26 is executing instructions from a 32-bit MIPS code segment. The '0' value of the MIPS16 MODE signal forwarded to instruction decompressor 22 may be used to signal instruction decompressor 22 that code decompression is not required. Similarly, a '1' may be stored in MIPS16 mode bit 32 when processor core 26 is executing instructions from a MIPS16 code segment. The '1' value of the MIPS16 MODE signal forwarded to instruction decompressor 22 may be used to signal instruction decompressor 22 that code decompression is required.

Processor core 26 also includes a 32-bit program counter (PC) register 30 used to store an address of a starting byte of the next 32-bit instruction data block to be decoded and executed by processor core 26. In the embodiment of FIG. 3, the contents of a bit 1 of PC register 30 (i.e., PC[1]) is also forwarded to instruction decompressor 22. When processor core 26 is executing instructions from a MIPS16 code segment, instruction decompressor uses the contents of PC[1] to select between two 16-bit portions of the 32-bit instruction data block provided by instruction cache 24.

Processor core 26 also provides an ENDIAN signal to instruction decompressor 22. The ENDIAN signal indicates an "endian" property of CPU 20. For example, when the ENDIAN signal is a '1', CPU 20 and the external memory system coupled to CPU 20 may be big endian. On the other hand, when the ENDIAN signal is a '0', CPU 20 and the memory system may be little endian.

Figures 4A, 4B, 4C, 4D:
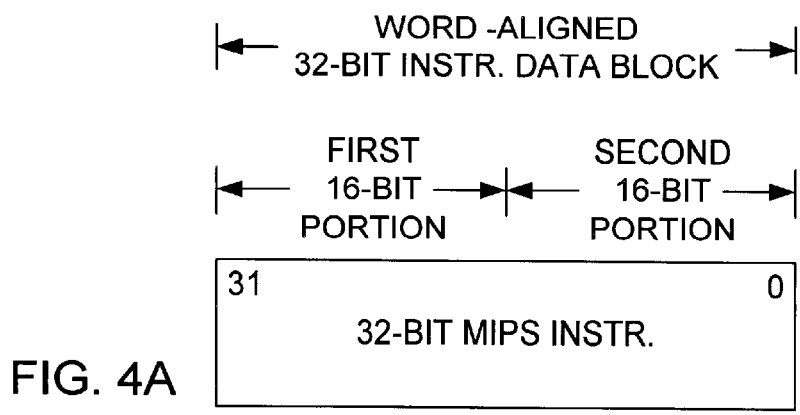
FIG. 4A illustrates a situation where a word-aligned 32-bit instruction data block includes a single 32-bit MIPS instruction.
FIG. 4B illustrates a situation where a word-aligned 32-bit instruction data block includes two consecutive 16-bit MIPS16 instructions.
FIG. 4C illustrates a situation where a word-aligned 32-bit instruction data block includes a single 32-bit MIPS16 instruction.
FIG. 4D illustrates a situation where a word-aligned 32-bit instruction data block includes a 16-bit MIPS16 instruction and the first 16 bits of a 32-bit MIPS16 instruction immediately following the 16-bit MIPS16 instruction.

FIGS. 4A–4D will now be used to show possible contents of a 32-bit instruction data block provided by instruction cache 24 and received by instruction decompressor 22. In FIGS. 4A–4D, the 32-bit instruction data block is aligned on 4-byte (i.e., word) boundaries of code segments. FIG. 4A illustrates a situation where the word-aligned 32-bit instruction data block includes a single 32-bit MIPS instruction (e.g., of a 32-bit MIPS code segment). FIG. 4B illustrates a situation where the word-aligned 32-bit instruction data block includes two consecutive 16-bit MIPS16 instructions (e.g., of a MIPS16 code segment). One of the two MIPS16 instructions resides in a first 16-bit portion of the 32-bit instruction data block, and the other MIPS16 instruction resides in a second 16-bit portion of the 32-bit instruction data block.

FIG. 4C illustrates a situation where the word-aligned 32-bit instruction data block includes a single 32-bit MIPS16 instruction (e.g., of a MIPS16 code segment). The 32-bit MIPS16 instruction may be, for example, a JAL/JALX instruction or an EXTEND instruction. In FIG. 4C, the 32-bit MIPS16 instruction is said to be aligned on word boundaries of a MIPS16 code segment.

FIG. 4D illustrates a situation where the word-aligned 32-bit instruction data block includes a 16-bit MIPS16 instruction and the first 16 bits of a 32-bit MIPS16 instruction immediately following the 16-bit MIPS16 instruction. The 32-bit MIPS16 instruction may be, for example, a JAL/JALX instruction or an EXTEND instruction. The 16-bit MIPS16 instruction resides in the first 16-bit portion of the 32-bit instruction data block, and the first 16 bits of the 32-bit MIPS16 instruction resides in the second 16-bit portion of the 32-bit instruction data block. In FIG. 4D, the 16-bit MIPS16 instruction is said to be aligned on a word boundary of a MIPS16 code segment, and the 32-bit MIPS16 instruction is said to be aligned on an odd 2-byte (i.e., half word) boundary of the MIPS16 code segment.

When executing compressed code, known instruction decompression systems fetch 32-bit instruction data blocks twice: once during each of two consecutive cycles of a clock signal. During a first of the two clock cycles, the known systems fetch a 32-bit instruction data block, and examine the contents of the first 16-bit portion of the 32-bit instruction data block. During the second clock cycle, the known systems fetch the same 32-bit instruction data, and examine the contents of the second 16-bit portion of the 32-bit instruction data block. Using this approach, known systems are not always able to provide 32-bit MIPS instructions to processor core 26 (FIG. 3) during each cycle of the clock signal.

For example, in the situation of FIG. 4C, the known instruction decompression systems fetch the 32-bit instruction data block during the first cycle, and examine the contents of the first 16-bit portion of the 32-bit instruction data block. The known systems recognize the contents of the first 16-bit portion of the 32-bit instruction data block as a first portion of a 32-bit MIPS16 instruction, and save the first 16-bit portion of the 32-bit MIPS16 instruction. During the second clock cycle, the known systems fetch the 32-bit instruction data block of FIG. 4C again. The known systems concatenate the saved first 16-bit portion of the 32-bit MIPS16 instruction with the second 16-bit portion received during the second cycle, produce a 32-bit MIPS instruction corresponding to the 32-bit MIPS16 instruction, and provide the 32-bit MIPS instructions to processor core 26 (FIG. 3).

Thus in the situation of FIG. 4C, the known instruction decompression systems provide a 32-bit MIPS instruction to processor core 26 only during the second cycle. Having no 32-bit MIPS instruction to execute during the first cycle of the clock signal, processor core 26 is idle during the first cycle, reducing the performance of CPU 20 (FIG. 3).

In the situation of FIG. 4D, the known instruction decompression systems provide the 32-bit MIPS instruction corresponding to the 16-bit MIPS16 instruction to processor core 26 during the first clock cycle. During the second clock cycle, the known systems fetch the 32-bit instruction data block of FIG. 4D again, and examine the contents of the second 16-bit portion of the 32-bit instruction data block. The known systems recognize the contents of the second 16-bit portion of the 32-bit instruction data block as a first portion of a 32-bit MIPS16 instruction, and save the first 16-bit portion of the 32-bit MIPS16 instruction. During a third cycle of the clock signal, the known instruction decompression systems fetch the next 32-bit instruction data block including the second 16-bit portion of the 32-bit MIPS16 instruction. The known systems concatenate the saved first 16-bit portion of the 32-bit MIPS16 instruction with the second 16-bit portion received during the third cycle, produce a 32-bit MIPS instruction corresponding to the 32-bit MIPS16 instruction, and provide the 32-bit MIPS instructions to processor core 26 (FIG. 3).

Thus in the situation of FIG. 4D, the known instruction decompression systems provide a 32-bit MIPS instruction to processor core 26 only during the first and third cycles of the clock signal. Having no 32-bit MIPS instruction to execute during the second cycle of the clock signal, processor core 26 is idle during the second cycle, reducing the performance of CPU 20 (FIG. 3).

Figure 5:
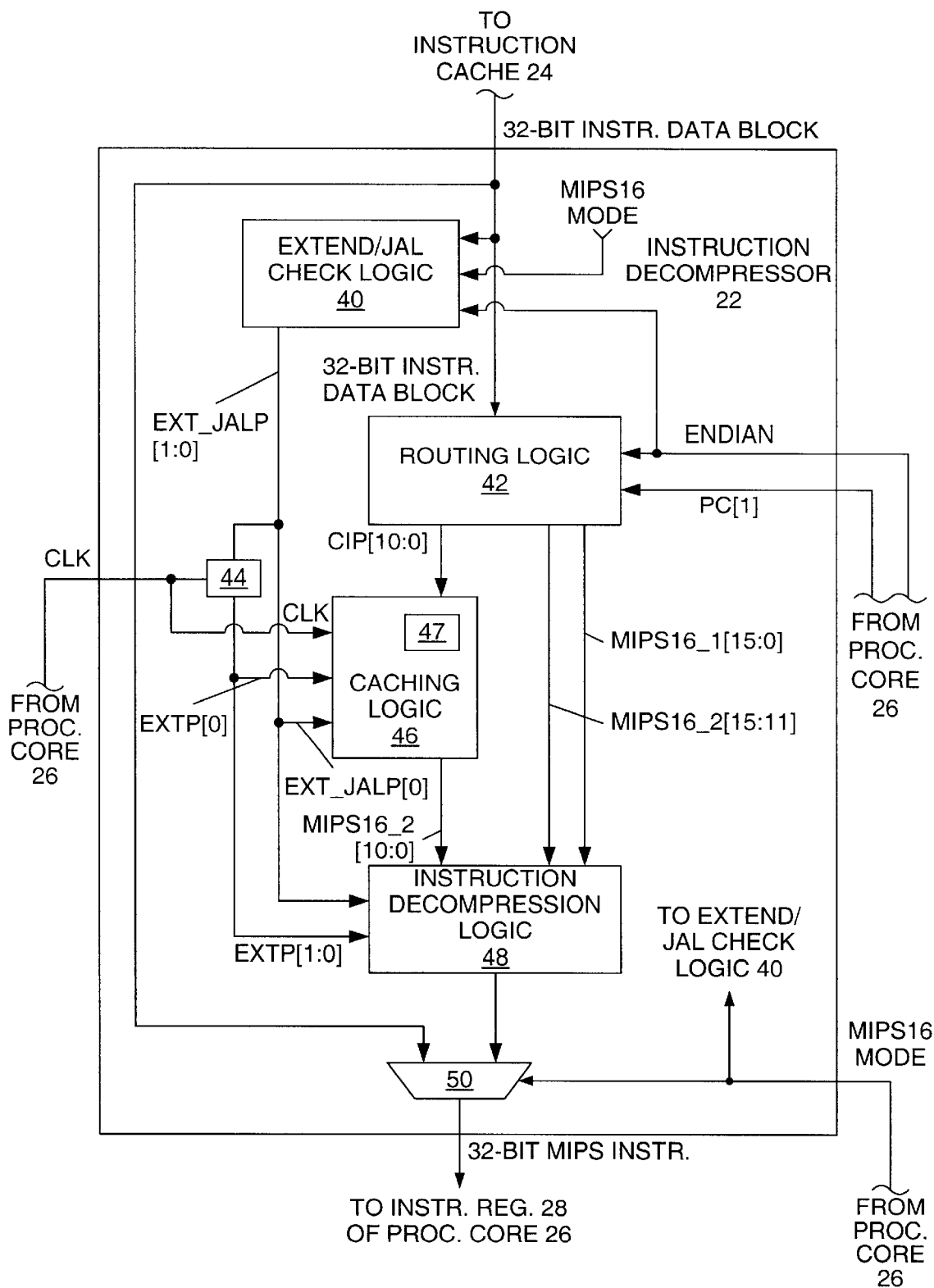
FIG. 5 is a diagram of one embodiment of the instruction decompressor of FIG. 3.

FIG. 5 is a diagram of one embodiment of instruction decompressor 22 of FIG. 3. In the embodiment of FIG. 5, instruction decompressor 22 includes EXTEND/JAL check logic 40, routing logic 42, a storage unit 44, caching logic 46, instruction decompression logic 48, and a multiplexer 50.

EXTEND/JAL check logic 40 receives 32-bit instruction data blocks from instruction cache 24, the MIPS16 MODE signal from processor core 26 (FIG. 3), and the ENDIAN signal from processor core 26 (see FIG. 3). EXTEND/JAL check logic 40 generates two control signals EXT_JALP[0] and EXT_JALP[1] dependent upon the contents of the 32-bit instruction data block, the MIPS16 MODE signal, and the ENDIAN signal. Often routed together, the two control signals are often referred to herein as a 2-bit control signal EXT_JALP[1:0]. Table 1 below lists exemplary values of the EXT_JALP[1:0] control signal when the MIPS16 MODE signal is a '1' indicating the need to decompress MIPS16 instructions.

TABLE 1

Exemplary Values of the EXT_JALP[1:0] Control Signal When MIS16 MODE = 1.

| Contents of 32-bit Instruction Block | EXT_JALP[1:0] |
|---|---|
| No EXTEND or JAL/JALX Instr. | 00 |
| JAL/JALX Instr. On Odd Half Word Boundary | 01 |
| EXTEND or JAL/JALX Instr. On Word Boundary | 10 |
| EXTEND Instr. On Odd Half Word Boundary | 11 |

According to the exemplary values of the EXT_JALP[1:0] control signal in Table 1, the EXT_JALP[0] control signal is a logic '0' when the 32-bit instruction data block either: (i) does not include a 32-bit MIPS16 EXTEND or JAL/JALX instruction, or (ii) includes a 32-bit MIPS16 EXTEND or JAL/JALX instruction on a word boundary. The EXT_JALP[0] control signal is a logic '1' when the 32-bit instruction data block includes a 32-bit MIPS16 JAL/JALX or EXTEND instruction on a half-word boundary.

The EXT_JALP[1] control signal is a logic '0' when the 32-bit instruction data block either: (i) does not include a 32-bit MIPS16 EXTEND or JAL/JALX instruction, or (ii) includes a 32-bit MIPS16 JAL/JALX instruction on a half-word boundary. The EXT_JALP[1] control signal is a logic '1' when the 32-bit instruction data block includes either: (i) a 32-bit MIPS16 EXTEND or JAL/JALX instruction on a word boundary, or (ii) a 32-bit MIPS16 EXTEND instruction on a half-word boundary.

In order to generate the EXT_JALP[1:0] control signal, EXTEND/JAL check logic 40 may decode opcode portions of MIPS16 instructions within the 32-bit instruction data block in order to determine instruction types.

Routing logic 42 receives the 32-bit instruction data block from instruction cache 24 (FIG. 3), the contents of PC[1] forwarded from PC register 30 of processor core 26 (FIG. 3), and the ENDIAN signal from processor core 26. Routing logic 42 routes portions of the 32-bit instruction data block to a first output, a second output, and a third output dependent upon the contents of PC[1] and the ENDIAN signal, thus producing a MIPS16_1[15:0] signal at the first output, a MIPS16_2[15:11] signal at the second output, and a CIP[10:0] signal at the third output.

During a first cycle of the CLK signal during processing of the 32-bit instruction data block, the contents of PC[1] and the ENDIAN signal may have certain values such that the MIPS16_1[15:0] signal produced by routing logic 42 is the first 16-bit portion of the 32-bit instruction data block, the MIPS16_2[15:11] signal is the 5 most significant (i.e., highest ordered) bits of the second 16-bit portion of the 32-bit instruction data block, and the CIP[10:0] signal is the 11 least significant (i.e., lowest ordered) bits of the second 16-bit portion of the 32-bit instruction data block.

It is noted that in the embodiment of FIG. 5, the 32-bit instruction data blocks are always aligned on 4-byte (i.e., word) boundaries of code segments. When the 32-bit instruction data block includes a 32-bit MIPS16 instruction on an odd half word boundary (as in FIG. 4D), the 5 most significant (i.e., highest ordered) bits of the second 16-bit portion of the 32-bit instruction data block is the opcode of the 32-bit MIPS16 instruction.

Storage unit 44 is used to delay the EXT_JALP[1:0] control signal by one cycle of the CLK signal. Storage unit 44 receives the EXT_JALP[1] and EXT_JALP[0] control signals at different data inputs, and clock signal CLK at a clock input. Storage unit 44 produces an EXTP[0] control signal and an EXTP[1] control signal at data outputs, where the value of the EXTP[0] control signal is the value of the EXT_JALP[0] control signal just before a transition of clock signal CLK, and the value of the EXTP[1] control signal is the value of the EXT_JALP[1] control signal just before the transition of clock signal CLK. Often routed together, the two control signals are often referred to herein as a 2-bit control signal EXTP[1:0]. Storage unit 44 thus delays the EXT_JALP[1:0] control signal by a single cycle of the CLK signal, producing the delayed EXT_JALP[1:0] control signal as the EXTP[1:0] control signal.

Storage unit 44 may be, for example, a pair of D flip-flops. Each of the pair of D flip-flops may receive a different one of the EXT_JALP[0] and EXT_JALP[1] control signals at a data input, and clock signal CLK at a clock input. The pair of D flip-flops may produce the EXTP[0] and EXTP[1] control signals at different Q outputs.

Caching logic 46 includes a storage unit 47 for storing data. Caching logic 46 receives the CIP[10:0] signal produced by routing logic 42, clock signal CLK forwarded from processor core 26 (FIG. 3), the EXTP[0] control signal produced by storage unit 44, and the EXT_JALP[0] control signal produced by EXTEND/JAL check logic 40. Caching logic 46 is configured to store the CIP[10:0] signal within storage unit 47 dependent upon the EXT_JALP[0] control signal.

During the first cycle of the CLK signal during which the 32-bit instruction data block is processed, the CIP[10:0] signal may be the 11 least significant (i.e., lowest ordered) bits of the second 16-bit portion of the 32-bit instruction data block. The EXT_JALP[0] control signal may be a logic '1' indicating that the 32-bit instruction data block includes a 32-bit MIPS16 JAL/JALX or EXTEND instruction an odd half-word boundary. In this situation, caching logic 46 stores the CIP[10:0] signal within storage unit 47 during the first cycle of the CLK signal in response to the EXT_JALP[0] control signal. In one embodiment, storage unit 47 is an 11-bit register which stores the CIP[10:0] signal in response to the CLK signal gated by the EXT_JALP[0] control signal.

It is noted that when the 32-bit instruction data block includes a 32-bit MIPS16 JAL/JALX instruction on an odd half word boundary (see FIG. 4D), the 11 least significant (i.e., lowest ordered) bits of the second 16-bit portion of the 32-bit instruction data block are the 11 most significant (i.e., highest ordered) bits of the 26-bit target address portion of the JAL/JALX instruction. When the 32-bit instruction data block includes a 32-bit MIPS16 EXTEND instruction on an odd half word boundary, the 11 least significant (i.e., lowest ordered) bits of the second 16-bit portion of the 32-bit instruction data block are 11 bits of the data used to extend the fields of the MIPS16 instruction specified by the MIPS16_1[15:0] signal produced by routing logic 42.

Caching logic 46 is configured to produce a MIPS16_2[10:0] signal at an output. Dependent upon the EXTP[0] control signal, the bits of the MIPS16_2[10:0] signal have the same values as either: (i) corresponding bits of the CIP[10:0] signal received from routing logic 42, or (ii) corresponding bits of storage unit 47. As described above, the EXTP[0] signal is the EXT JALP[0] control signal delayed by one cycle of the CLK signal. Caching logic 46 produces the MIPS16_2[10:0] signal having the same value as the CIP[10:0] signal received from routing logic 42 when the EXTP[0] control signal indicates that during the previous cycle of the CLK signal, the 32-bit instruction data block either: (i) did not include a 32-bit MIPS16 EXTEND instruction or a 32-bit MIPS16 JAL/JALX instruction, or (ii) included a 32-bit MIPS16 JAL/JALX instruction or a 32-bit MIPS16 EXTEND instruction on a word boundary.

Caching logic 46 produces the MIPS16_2[10:0] signal having the value of the contents of storage unit 47 when the EXTP[0] control signal indicates that during the previous cycle of the CLK signal, the 32-bit instruction data block included either a 32-bit MIPS16 JAL/JALX instruction or a 32-bit MIPS16 EXTEND instruction on an odd half word boundary. During a first cycle of the CLK signal during which a 32-bit instruction data block is being processed, caching logic 46 produces the contents of storage unit 47 as the MIPS16_2[10:0] signal at the output when the EXTP[0] control signal indicates that the previous 32-bit instruction data block included either a 32-bit MIPS16 JAL/JALX instruction or a 32-bit MIPS16 EXTEND instruction on an odd half word boundary.

Thus in situations where the second 16-bit portion of a 32-bit instruction data block includes only a first half of a 32-bit MIPS16 instruction (as in FIG. 4D), caching logic 46 is used to make bits 0–10 of the second 16-bit portion of the 32-bit instruction data block available as the MIPS16_2[10:0] signal when the next 32-bit instruction data block is processed by instruction decompressor 22. During the processing of the next 32-bit instruction data block, the value of the EXTP[1] control signal indicates whether the previous 32-bit instruction data block included a 32-bit MIPS16 JAL/JALX instruction or a 32-bit MIPS16 EXTEND instruction.

Instruction decompression logic 48 receives the MIPS16_1[15:0] and MIPS16_2[15:11] signals produced by routing logic 42, the MIPS16_2[10:0] signal produced by caching logic 46, the EXT_JALP[1:0] control signal produced by EXTEND/JAL check logic 40, and the EXTP[1:0] signal produced by the storage unit 44. Instruction decompression logic 48 is configured to decompress a MIPS16 instruction, thereby producing the corresponding 32-bit MIPS instruction. The MIPS16 instruction decompressed by instruction decompression logic 48 is either: (i) a 16-bit MIPS16 instruction specified by MIPS16_1[15:0] signal, or (ii) a 32-bit MIPS16 instruction specified by concatenating the MIPS16_2[15:11] signal, the MIPS16_2[10:0] signal, and the MIPS16_1[15:0] signal, or (iii) a 32-bit MIPS16 instruction specified by the EXTP[1:0] signal, the MIPS16_2[10:0] signal, and the MIPS16_1[15:0] signal. As described above, where the EXTP[0] control signal indicates that a previous 32-bit instruction data block included either a 32-bit MIPS16 JAL/JALX or EXTEND instruction on an odd half word boundary, the value of the EXTP[1] control signal indicates whether the previous 32-bit instruction data block included a 32-bit MIPS16 JAL/JALX instruction or a 32-bit MIPS16 EXTEND instruction. The EXT_JALP[1:0] and EXTP[1:0] control signals determine how a MIPS16 instruction is decompressed by instruction decompression logic 48.

Figure 6:
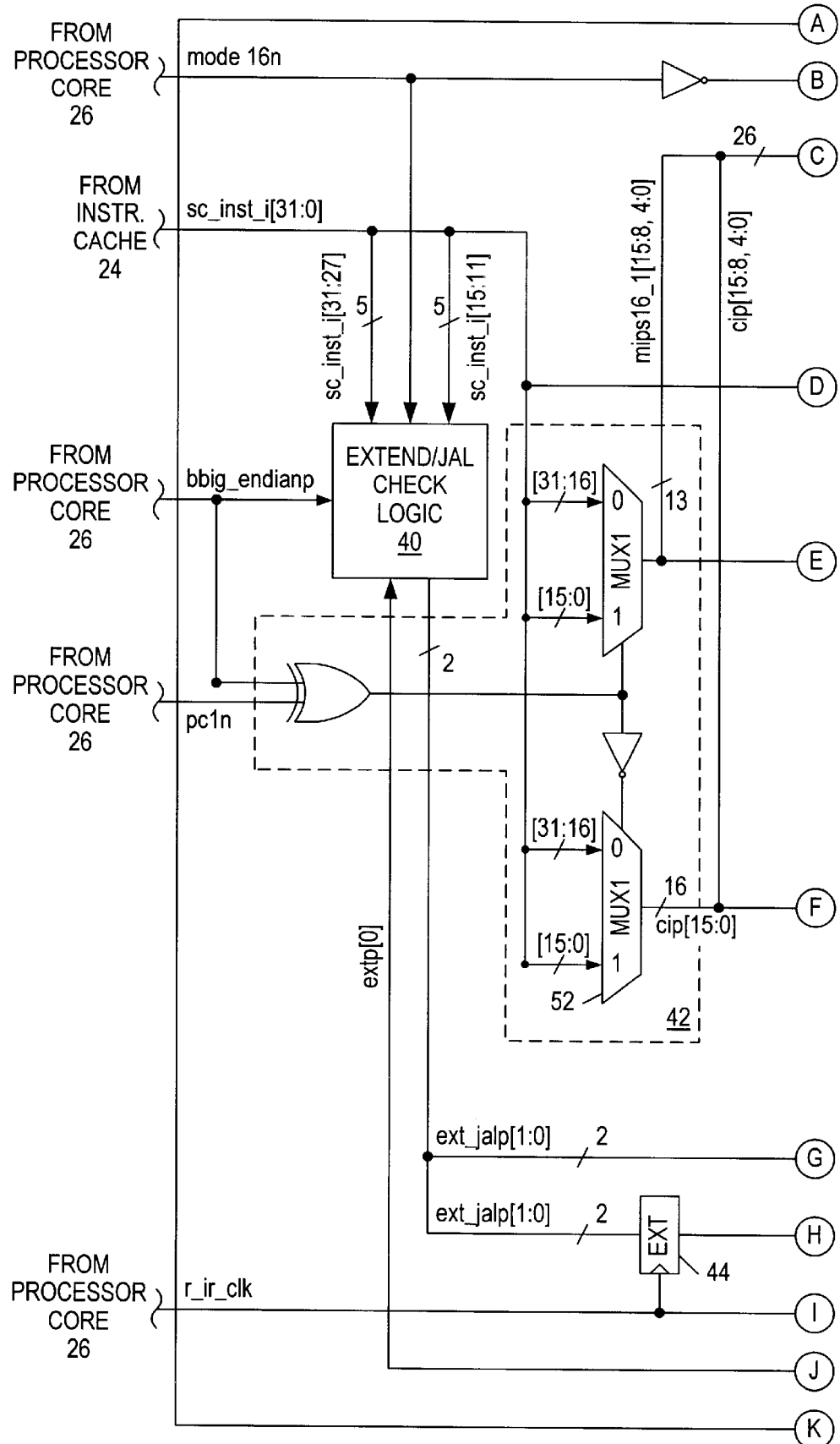
FIG. 6 is a diagram of one embodiment of the instruction decompressor of FIG. 5.
Figure 6:
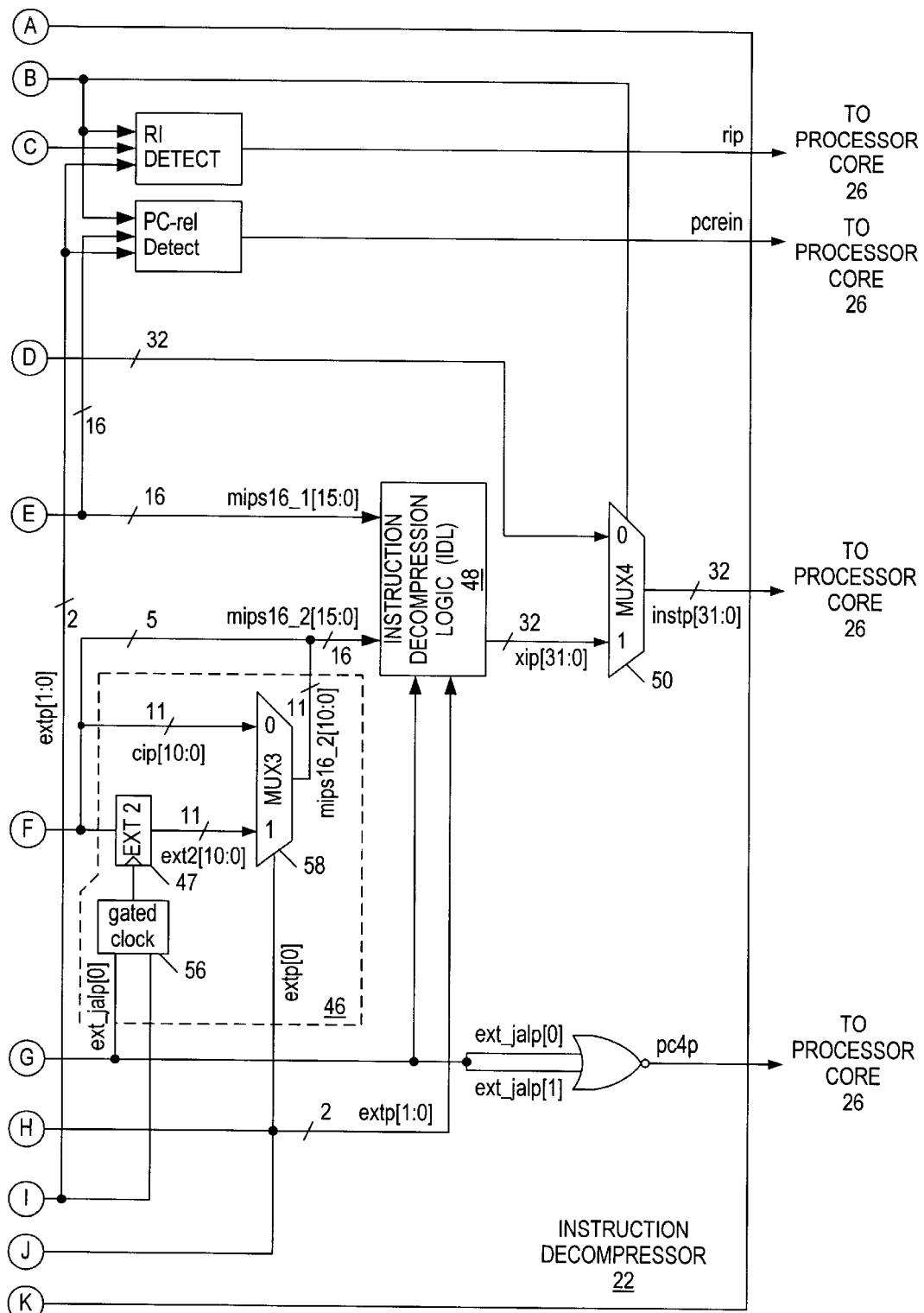

FIG. 6 is a diagram of one embodiment of instruction decompressor 22 of FIG. 5. In FIG. 6, the "mode16n" signal is the inverted MIPS16 MODE signal of FIG. 5, the "sc_inst_i[31:0]" signal is the 32-bit instruction data block of FIG. 5, "bbig_endianp" signal is the ENDIAN signal of FIG. 5, the "pc1n" signal is the inverted PC[1] signal of FIG. 5, the "r_ir_clk" is the CLK signal of FIG. 5, and the "instp[31:0]" signal is the 32-bit MIPS instruction of FIG. 5.

In the embodiment of FIG. 6, routing logic 42 includes a multiplexer 52 for routing the CIP[10:0] signal to caching logic 46. Elements shown in FIG. 5 and described above are labeled similarly in FIG. 6. Caching logic 46 includes storage unit 47, gating logic 56, and a multiplexer 58. As described above, storage unit 47 is used to store the CIP [10:0] signal. Gating logic 56 receives the CLK signal and the EXT_JALP[0] control signal, gates the CLK signal using the EXT_JALP[0] control signal, and provides the resulting gated CLK signal to storage unit 47 as a clock signal. Storage unit 47 receives the CIP[10:0] signal at data inputs, and the clock signal produced by gating logic 56 at a clock input. Storage unit 47 stores the CIP[10:0] signal in response to the clock signal, and produces the stored CIP [10:0] signal at outputs as an EXT2[10:0] signal.

Multiplexer 58 receives the CIP[10:0] signal at a first input port, the EXT2[10:0] signal produced by storage unit 47 at a second input port, and the EXTP[0] control signal at a control input. Multiplexer provides either the CIP[10:0] signal or the EXT2[10:0] signal to instruction decompression logic 48 as the MIPS16 _2[10:0] signal dependent upon the EXTP[0] control signal.

In the embodiment of FIG. 6, instruction decompressor 22 produces additional "rip", "pcreln", and "pc4p" signals. The "rip" signal is used to indicate that the current MIPS16 instruction is an extended non-extendable instruction or a reserved instruction. The "pcreln" signal is used to indicate that the current decompressed 32-bit MIPS instruction is a program counter relative instruction using the contents of PC register 30 (FIG. 3) as a base register. The "pc4p" signal is used to indicate whether the next value of PC register 30 is the current value of PC register 30 plus 4, or plus 2. When the "pc4p" signal is a '1', the next value of PC register 30 is the current value of PC register 30 plus 4. When the "pc4p" signal is a '0', the next value of PC register 30 is the current value of PC register 30 plus 2.

Figure 7:
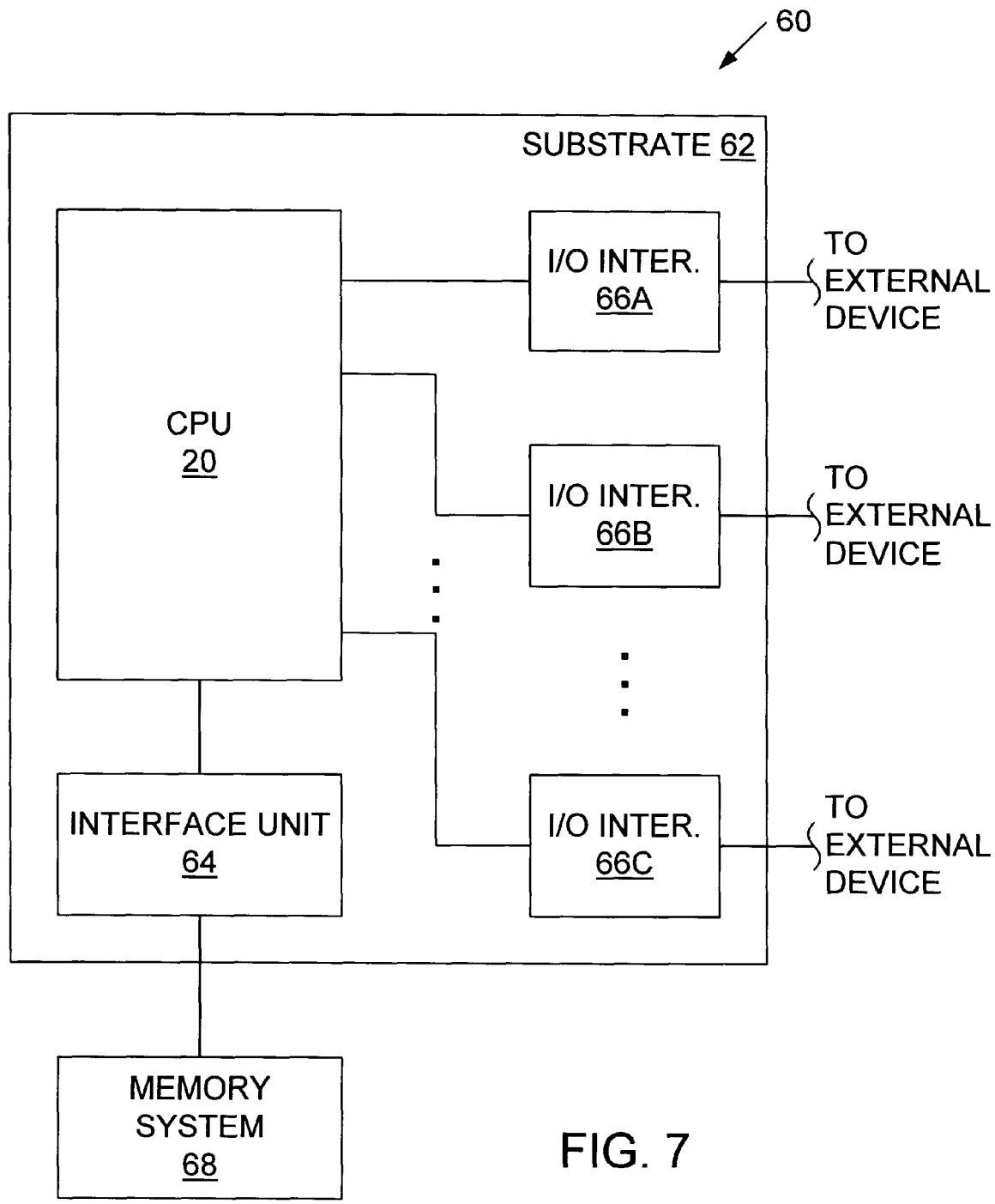
FIG. 7 is a diagram of an exemplary computer system including the CPU of FIG. 3.

FIG. 7 is a diagram of an exemplary computer system 60 including CPU 20. Within computer system 60, CPU 20 is formed upon a surface of a semiconductor substrate 62 along with an interface unit 64 and multiple I/O interfaces 66A–66C. Interface unit 64 interfaces with a memory system 68 external to substrate 62. Memory system 68 stores code executed by CPU 20. As described above, the code may include 32-bit MIPS instructions, MIPS16 instructions, or a combination of 32-bit MIPS instructions and MIPS16 instructions. I/O interfaces 66 are coupled to I/O devices external to substrate 62. One or more of the I/O interfaces 66 may be, for example, a universal asynchronous receiver/transmitter (UART).

Numerous variations and modifications will become apparent to those skilled in the art once the above disclosure is fully appreciated. It is intended that the following claims be interpreted to embrace all such variations and modifications.

What is claimed is:

1. An apparatus, comprising:
   instruction decompression logic coupled to receive a first portion of an instruction data block, an output signal, and a control signal during a time period, wherein the instruction data block includes a first variable-length instruction, and wherein the instruction decompression logic is configured to produce a fixed-length instruction during the time period dependent upon the first portion of the instruction data block, the output signal, and the control signal; and
   caching logic comprising a storage unit and coupled to receive a second portion of the instruction data block and the control signal during the time period, and wherein the storage unit is configured to store the second portion of the instruction data block within the storage unit during the time period dependent upon the control signal, and wherein the caching logic is configured to produce the output signal, wherein during the time period the output signal is either the second portion of the instruction data block or the contents of the storage unit.

2. The apparatus as recited in claim 1, wherein the apparatus is an instruction decompressor for translating variable-length instructions to fixed-length instructions.

3. The apparatus as recited in claim 1, wherein the instruction data block comprises a fixed number of bits of instruction data.

4. The apparatus as recited in claim 1, wherein the instruction data block comprises 32 bits of instruction data.

5. The apparatus as recited in claim 1, wherein the first variable-length instruction is a MIPS16 instruction.

6. The apparatus as recited in claim 1, wherein the fixed-length instruction is a 32-bit MIPS instruction.

7. The apparatus as recited in claim 1, wherein the time period is a single cycle of a clock signal.

8. The apparatus as recited in claim 1, wherein the caching logic is configured to store the second portion of the instruction data block within the storage unit during the time period when the control signal indicates the instruction data block includes only a portion of a second variable-length instruction.

9. The apparatus as recited in claim 1, further comprising:
   check logic coupled to receive the instruction data block and configured to produce the control signal dependent upon whether or not the instruction data block includes only a portion of a second variable-length instruction.

10. The apparatus as recited in claim 1, further comprising:
    routing logic coupled to receive the instruction data block and configured to produce the first and second portions of the instruction data block.

11. An apparatus, comprising:
    check logic coupled to receive an instruction data block including a first variable-length instruction, wherein the check logic is configured to produce a control signal dependent upon whether or not the instruction data block includes only a portion of a second variable-length instruction;
    routing logic coupled to receive the instruction data block and configured to produce a first portion of the instruction data block and a second portion of the instruction data block;
    caching logic comprising a storage unit and coupled to receive the second portion of the instruction data block and the control signal during a time period, wherein the caching logic is configured to store the second portion of the instruction data block within the storage unit during the time period dependent upon the control signal, and wherein the caching logic is configured to produce an output, wherein during the time period the output is either the second portion of the instruction data block or the contents of the storage unit; and
    instruction decompression logic coupled to receive the first portion of the instruction data block, the output of the caching logic, and the control signal during the time period, wherein the instruction decompression logic is configured to produce a fixed-length instruction during the time period dependent upon the first portion of the instruction data block, the output of the caching logic, and the control signal.

12. The apparatus as recited in claim 11, wherein the apparatus is an instruction decompressor for translating variable-length instructions to fixed-length instructions.

13. The apparatus as recited in claim 11, wherein the instruction data block comprises a fixed number of bits of instruction data.

14. The apparatus as recited in claim 11, wherein the instruction data block comprises 32 bits of instruction data.

15. The apparatus as recited in claim 11, wherein the first variable-length instruction is a MIPS16 instruction.

16. The apparatus as recited in claim 11, wherein the fixed-length instruction is a 32-bit MIPS instruction.

17. The apparatus as recited in claim 11, wherein the time period is a single cycle of a clock signal.

18. The apparatus as recited in claim 11, wherein the storage unit of the caching logic is configured to store the second portion of the instruction data block within the storage unit during the time period when the control signal indicates the instruction data block includes only a portion of a second variable-length instruction.

19. A method for translating variable-length instructions to fixed-length instructions, comprising:
receiving an instruction data block including a first variable-length instruction;
performing the following steps simultaneously:
translating the first variable-length instruction to produce a fixed-length instruction; and
if the instruction data block includes only a portion of a second variable-length instruction, saving at least a part of the portion of the second variable-length instruction for use in subsequent translating of the second variable-length instruction.

20. The method as recited in claim 19, wherein the portion of the second variable-length instruction comprises information identifying the instruction type and instruction data, and wherein the saving comprises:
saving a value of a control signal indicating the instruction type; and
saving at least a part of the instruction data.

21. A central processing unit, comprising:
an instruction decompressor, comprising:
instruction decompression logic coupled to receive a first portion of an instruction data block, an output signal, and a control signal during a time period, wherein the instruction data block includes a first variable-length instruction, and wherein the instruction decompression logic is configured to produce a fixed-length instruction during the time period dependent upon the first portion of the instruction data block, the output signal, and the control signal;
caching logic comprising a storage unit and coupled to receive a second portion of the instruction data block and the control signal during the time period, and wherein the caching logic is configured to store the second portion of the instruction data block within the storage unit during the time period dependent upon the control signal, and wherein the caching logic is configured to produce the output signal, wherein during the time period the output signal is either the second portion of the instruction data block or the contents of the storage unit; and
a processor core coupled to receive the fixed-length instruction produced by the instruction decompression logic and configured to execute the fixed-length instruction.

22. The apparatus as recited in claim 21, wherein the instruction data block comprises a fixed number of bits of instruction data.

23. The apparatus as recited in claim 21, wherein the instruction data block comprises 32 bits of instruction data.

24. The apparatus as recited in claim 21, wherein the first variable-length instruction is a MIPS16 instruction.

25. The apparatus as recited in claim 21, wherein the fixed-length instruction is a 32-bit MIPS instruction.

26. The apparatus as recited in claim 21, wherein the time period is a single cycle of a clock signal.

27. The apparatus as recited in claim 21, wherein the storage unit of the caching logic is configured to store the second portion of the instruction data block within the storage unit during the time period when the control signal indicates the instruction data block includes only a portion of a second variable-length instruction.

28. A computer system, comprising:
a central processing unit, comprising:
an instruction decompressor, comprising:
instruction decompression logic coupled to receive a first portion of an instruction data block, an output signal, and a control signal during a time period, wherein the instruction data block includes a first variable-length instruction, and wherein the instruction decompression logic is configured to produce a fixed-length instruction during the time period dependent upon the first portion of the instruction data block, the output signal, and the control signal;
caching logic comprising a storage unit and coupled to receive a second portion of the instruction data block and the control signal during the time period, and wherein the caching logic is configured to store the second portion of the instruction data block within the storage unit during the time period dependent upon the control signal, and wherein the caching logic is configured to produce the output signal, wherein during the time period the output signal is either the second portion of the instruction data block or the contents of the storage unit; and
a processor core coupled to receive the fixed-length instruction produced by the instruction decompression logic and configured to execute the fixed-length instruction.

29. The apparatus as recited in claim 28, wherein the instruction data block comprises a fixed number of bits of instruction data.

30. The apparatus as recited in claim 28, wherein the instruction data block comprises 32 bits of instruction data.

31. The apparatus as recited in claim 28, wherein the first variable-length instruction is a MIPS16 instruction.

32. The apparatus as recited in claim 28, wherein the fixed-length instruction is a 32-bit MIPS instruction.

33. The apparatus as recited in claim 28, wherein the time period is a single cycle of a clock signal.

34. The apparatus as recited in claim 28, wherein the storage unit of the caching logic is configured to store the second portion of the instruction data block within the storage unit during the time period when the control signal indicates the instruction data block includes only a portion of a second variable-length instruction.

* * * * *